A. SUNDH.
HYDRAULIC VARIABLE GEAR TRANSMISSION.
APPLICATION FILED MAR. 31, 1909.

1,058,271.

Patented Apr. 8, 1913.

Witnesses:
J. G. Bethell.
J. F. Rule

Inventor:
August Sundh
By
L. H. Campbell
Attorney

UNITED STATES PATENT OFFICE.

AUGUST SUNDH, OF YONKERS, NEW YORK, ASSIGNOR TO OTIS ELEVATOR COMPANY, OF JERSEY CITY. NEW JERSEY, A CORPORATION OF NEW JERSEY.

HYDRAULIC VARIABLE-GEAR TRANSMISSION.

1,058,271. Specification of Letters Patent. Patented Apr. 8, 1913.

Application filed March 31, 1909. Serial No. 486,849.

*To all whom it may concern:*

Be it known that I, AUGUST SUNDH, a citizen of the United States, residing at Yonkers, in the county of Westchester and State of New York, have invented a new and useful Improvement in Hydraulic Variable-Gear Transmission, of which the following is a specification.

My invention relates to means for transmitting power by fluid pressure, and more particularly comprises mechanism in which a driving shaft receiving power from any suitable source is connected to operate a pump or pumps to supply fluid under pressure; the fluid in turn operating to drive a motor or motors geared to the mechanism to be driven.

Many attempts have been made to obtain power transmission mechanism operated by fluid pressure, but these have generally been unsuccessful, owing to various causes; among these is the low efficiency usually obtained, the trouble experienced from leakage of the power transmitting fluid, and the difficulty of overcoming these objections.

One of the objects of the present invention is to overcome these objections and produce a highly efficient mechanism which is durable and also simple in construction and comparatively inexpensive, and in which the speed and torque and the driven member may be varied from zero to a maximum, or vice versa.

The invention further involves novel controlling mechanism whereby the speed and torque may be controlled at the will of the operator, and which may be gradually varied so as to secure a smooth operation as the speed is altered.

Other objects of the invention and various other features of novely will appear hereinafter; the scope of the invention is defined in the appended claims which set forth the novel combinations of elements.

Referring to the accompanying drawings, in which are illustrated several forms of construction embodying my invention, Figs. 2, 3 and 4 are sectional elevation views taken on the planes indicated on the lines 2—2, 3—3 and 4—4 respectively of Fig. 1; Fig. 6 is a section on the line 6—6 of Fig. 5; Fig. 19 shows another modification of the mechanism illustrated in Fig. 8; Figs. 20 and 21 are sectional detail views taken on the lines 20—20 and 21—21 respectively of Fig. 19.

Figure 1:
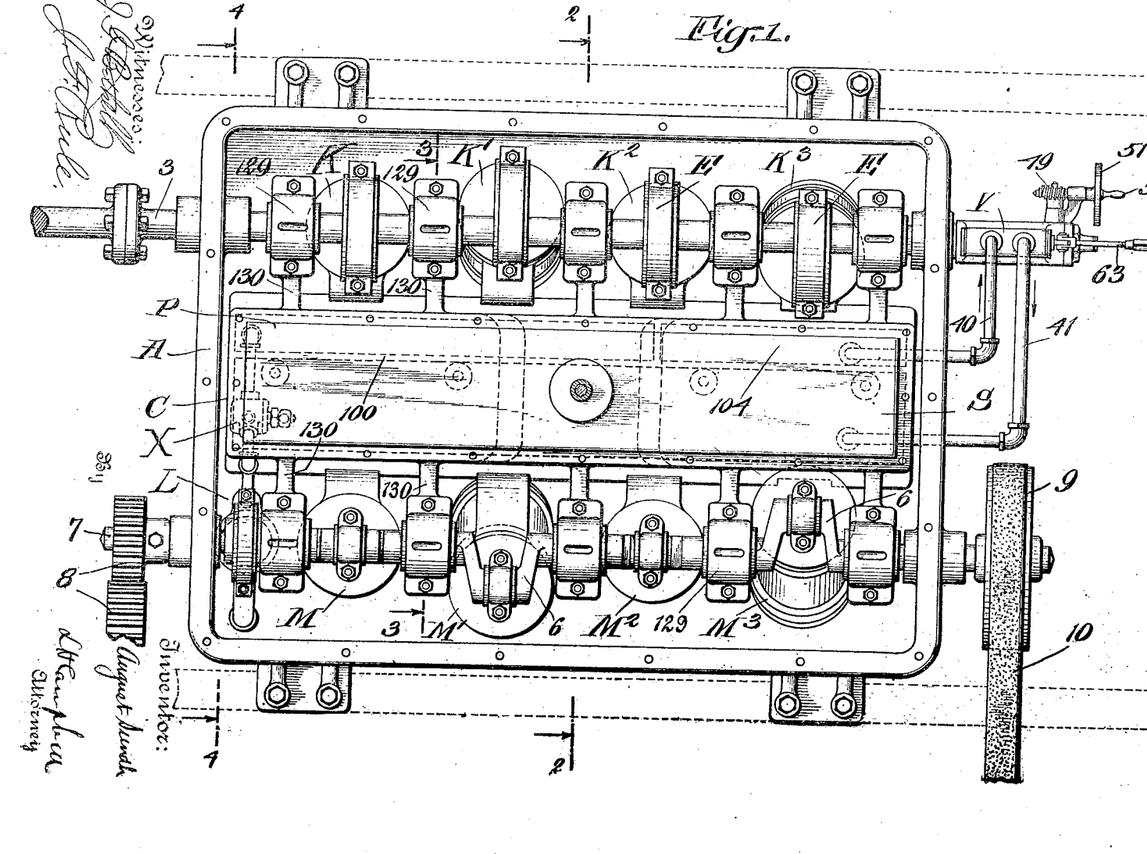
Figure 1 is a plan view of the power transmitting mechanism with the top cover of the casing removed for the purpose of clearness of illustration.

The general arrangement of the power transmission mechanism will be understood from a consideration of Figs. 1 and 2. As here shown the pump comprises a plurality of cylinders K, K′, K² and K³, in each of which is a reciprocating piston 1 connected by a piston rod 2 to an eccentric E. The eccentrics are driven by means of a driving shaft 3 connected to any suitable source of power supply. The pump operates to force a fluid 5, which is preferably a light oil, into a pressure chamber P. Water or other liquid may in some instances be employed as the power transmitting fluid, but oil is generally preferable as it serves to keep the operating mechanism well lubricated, does not evaporate, will not freeze in cold weather, and has other advantages over other liquids. The liquid is supplied from the pressure chamber to a fluid motor comprising cylinders M, M', M² and M³, similar to the pump cylinders. The fluid under pressure in the motor cylinders serves to reciprocate the pistons 1 and piston rods 2, which latter are connected to crank arms 6 connected to or integral with a driven shaft 7; the latter may be connected by toothed gear wheels 8, or by means of a drive pulley 9 and belt 10 or by any other suitable power transmitting device to the mechanism to be operated. The gear wheels 8, pulley 9, belt 10 and other parts operated by power transmitted through the motor shaft 7, may be considered as driven members as they are driven by power supplied by the motor. The exhaust fluid from the motor cylinders is discharged into a supply chamber S from whence it is again drawn into the pump cylinders, thereby completing the circulation of the fluid. Reversing valves R' and R² control the flow of fluid from the pressure chamber to the motor cylinders and determine the direction in which the motor operates, as will be fully set forth hereinafter. The pump, motor, pressure and supply chambers, reversing valves and associated mechanisms are inclosed in a substantially oil tight tank or casing A; this serves as a protection for the mechanism, excludes dust and dirt and if there is any leakage of the fluid, the same is not lost; means are provided as hereinafter described for again introducing into the circulation any fluid that may thus escape.

Figures 8, 9, 10, 11, 12, 13, 14, 15:
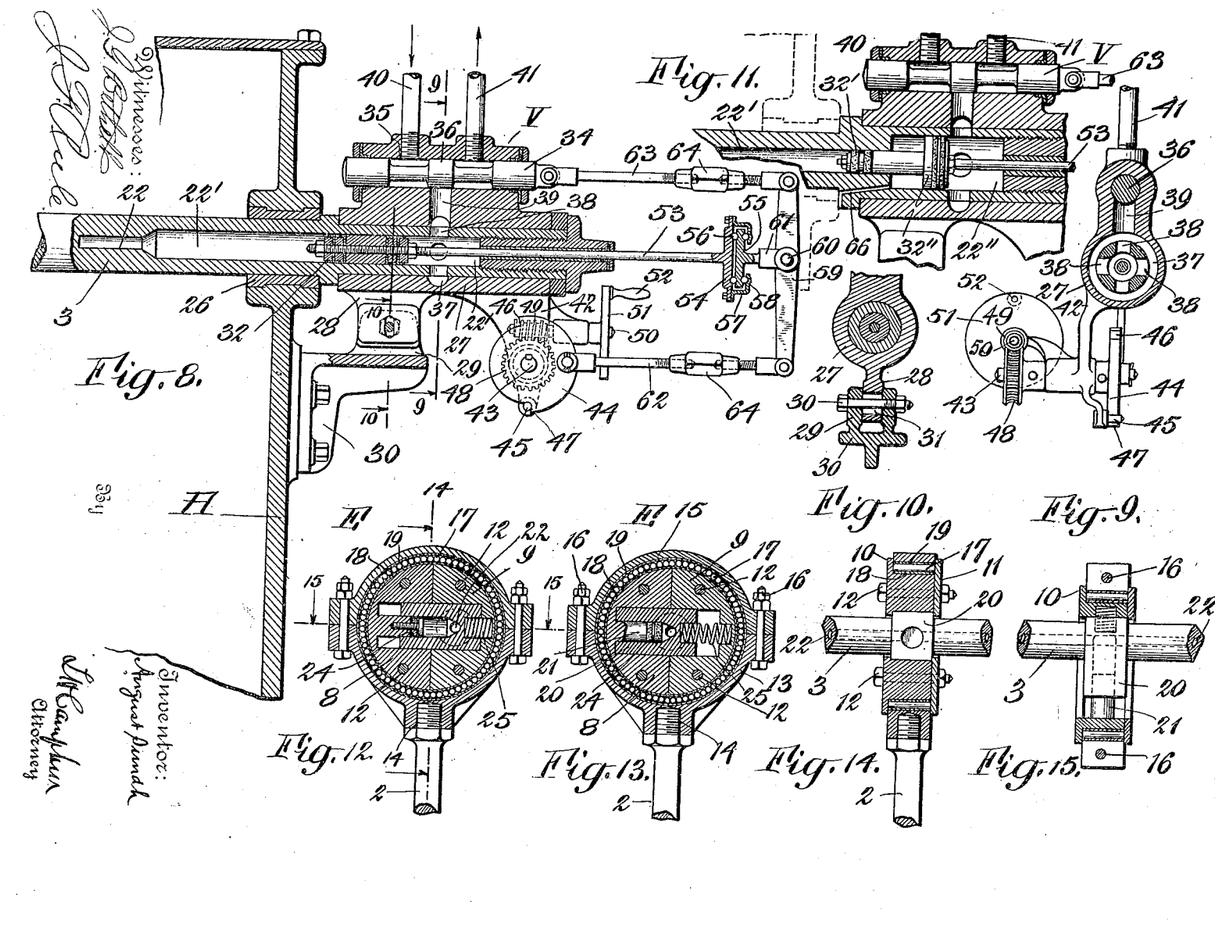
Fig. 8 is a sectional view of the mechanism for supplying fluid pressure to adjust the eccentrics for the pumps as indicated by the section line 8 in Fig. 1.
Figs. 9 and 10 are sectional views taken on the lines 9—9 and 10—10 respectively of Fig. 8.
Fig. 11 is a fragmentary view showing a modification of the mechanism shown in Fig. 8.
Fig. 12 is a sectional view of one of the eccentrics for driving the pumps, and showing means for adjusting the stroke of the piston.
Fig. 13 is a similar view with the parts adjusted to a different position.
Figs. 14 and 15 are sectional views taken on the lines 14—14 and 15—15 respectively of Fig. 12.

Figs. 12, 13, 14 and 15 illustrate in detail a construction of the eccentrics for driving the pump sections. Each eccentric comprises two semi-circular members 8 and 9, which together form a disk provided at one edge with a flange 10. A plate 11 is bolted to said disk at the side opposite the flange 10 by means of bolts 12. The flange 10 and plate 11 form with said disk an annular recess to receive the eccentric strap comprising the lower section 13 which as herein shown has a screw-threaded connection 14 with the piston rod 2, and an upper section 15. Bolts 16 secure the two sections 13 and 15 together. Anti-friction bearings which may be either ball bearings or roller bearings are provided to reduce the friction to a minimum. These bearings as here shown comprise an annular series of bearing rollers 17 carried between inner and outer rings 18 and 19 located between the eccentric strap and eccentric disk and held against longitudinal displacement by the flange 10 and plate 11. The sections 8 and 9 are provided with rectangular openings to receive an arm or block 20 which is preferably rectangular or square in cross section and is secured to or formed integral with the driving shaft 3 which extends through each eccentric. The openings in the eccentrics are made long enough to permit an adjustment longitudinally of the arm 20. The section 8 is provided with a cylindrical projection or piston 21 which works in a correspondingly shaped recess in the block 20. The purpose of this construction is to provide for the adjustment of the eccentric by means of fluid pressure which is supplied through an opening 22 in the shaft 3. A packing 24 may be provided on the end of the piston 21 to prevent leakage. A coil spring 25 is placed behind the block 20 to return the eccentric toward central position when the fluid pressure is relieved. Fig. 12 shows the position of the parts when fluid pressure has been supplied so as to move the eccentric outward to its extreme position in respect to the shaft. With the parts in this position a full stroke of the piston is secured. Fig. 13 shows the parts in the position assumed when the fluid pressure has been removed and the spring 25 has returned the eccentric to central position, in this position the rotation of the driving shaft will not transmit any motion to the pump piston. It will be understood that the description just given applies to all of the eccentrics which are substantially alike in construction.

Figures 3, 8, 19, 20, 21:
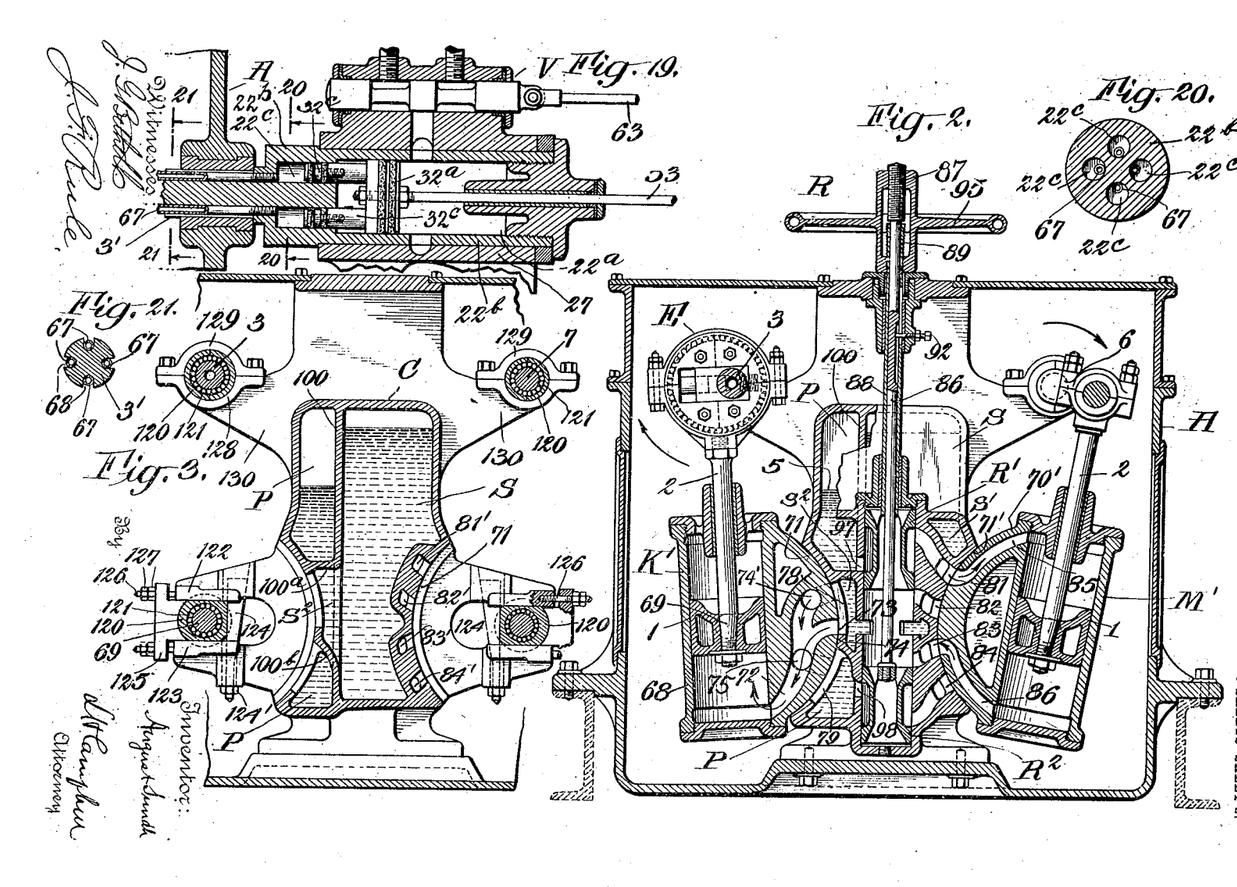

Mechanism for controlling the supply of fluid pressure for adjusting the eccentrics as shown in Figs. 8, 9 and 10 will now be described. The driving shaft 3 extends beyond the casing A, a bushing 26 being placed between the casing and shaft. On the extended end of the shaft 3 is mounted a sleeve 27. This sleeve has a depending flange 28 which is held in a bifurcated extension 29 (see Fig. 10) formed on a bracket 30, bolted or otherwise secured to the casing A. A bolt 31 extending through the flange 28 and part 29 serves to clamp the sleeve 27 rigidly in position. The elongated opening 31 in the flange 28 permits a vertical adjustment of the sleeve 27. The opening 22 extending through the driving shaft has an enlarged portion 22' forming with the extended end of the shaft a cylinder or valve chamber in which is adapted to reciprocate, a piston 32. Oil or other liquid fills the passages 22 and 22'. The liquid behind the piston 32 for operating the latter is controlled by means of a reversing valve V; this valve comprises a valve member 34 adapted to reciprocate in the valve chamber or opening 35 formed in an extension of the sleeve 27. The sleeve 27 is formed with an annular recess 37 which communicates through ports 38 in the shaft 3 with the opening 22' behind the piston 32. A passage 39 leads from the annular recess 37 to the pilot valve chamber. When the pilot valve is in central position the passage 39 is closed by the section 36 of the valve. When the pilot valve is moved to the right communication is established between the pressure pipe 40 and the passage 39. When the pilot valve is moved to the left from its central position, the passage 39 is opened to the exhaust pipe 41.

Mechanism for operating the pilot valve V will now be described. The bracket 42 which may be formed integral with the sleeve 27 has journaled therein a shaft 43. Keyed to this shaft is a disk 44 rotatable with the shaft through approximately 180 degrees. A stop pin 45 secured to the bracket 42 is located in the path of movement of shoulders 46 and 47 formed on the disk 44, thereby limiting the rotation of the latter in both directions. The shaft 43 is rotated by means of a worm wheel 48 keyed to said shaft and meshing with a worm 49 secured to a shaft 50 also journaled in the bracket 42. A disk 51 provided with a handle 52 serves as a means for operating the worm gear and thereby rotating the disk 44. The piston 32 is operated by a piston rod 53 which extends beyond the driving shaft 3 and is provided at its outer end with a thrust bearing head or disk 54. This bearing head 54 which rotates with the driving shaft is connected to a non-rotatable disk 55. Ball bearings 56 are placed between the disks 54 and 55. An annular flange or bearing member 57 is secured to the disk 54 and extends behind the disk 55. Ball bearings 58 are placed between this bearing member 57 and the disk 55. It will be seen that with this construction an endwise pressure may be brought to bear on the piston rod 53 to move the same longitudinally in either direction; at the same time a free rotation of the piston rod will be permitted while the disk 55 is held against rotation. A vertical lever 59 is pivoted at 60 to a stem 61 formed on the disk 55; the lower end of this lever is connected by a link 62 to the disk 44, and the upper end of the lever is connected by a link 63 to the reversing valve member 34. Turn buckles 64 which may be of ordinary construction are provided for adjusting the length of the links 62 and 63.

The operation of the mechanism just described will be understood from the following: The parts are shown in Fig. 8 in the position assumed when the eccentrics are in a central position as indicated by Fig. 13. If now it is desired to adjust the eccentrics so that the rotation of the driving shaft will operate the pump, the operator rotates the hand disk 51 which through the worm gearing rotates the disk 44 in a counter clockwise direction as viewed in Fig. 8. This moves the link 62 to the left, thereby rotating the lever 59 about its pivot 60 and moving the reversing valve to the right. This movement of the reversing valve opens up communication between the pressure pipe 40 and the valve chamber 22'. The pressure behind the piston 32 now drives the latter forward or to the left, forcing the liquid, which is in front of the piston, through the passage 22 and into the cylindrical openings in the eccentric blocks 20, thereby forcing the pistons 21 outward. The eccentrics are thus moved into position to cause the pump pistons to reciprocate as the driving shaft rotates. The length of a stroke of the pump pistons will be proportional to the distance through which the piston 32 has been moved by the operation just described. As the piston 32 moves forward due to the fluid pressure behind it, it moves the lever 59 about its lower end as a fulcrum, thereby bringing the pilot valve back to central position and cutting off the supply of fluid to the pressure pipe. The distance through which the piston 32 is moved forward depends of course upon the extent of rotation of the disk 44. The stroke of the pump pistons may therefore be varied from zero to a full stroke by operating the hand disk 51. If it is desired to decrease the stroke of the pump pistons, the disk 51 is rotated in the reverse direction; this operates through the link 62 to rotate the lever 59 about its pivot 60 and move the pilot valve to the left, thereby bringing the valve chamber 22' behind the valve 32 into communication with the exhaust pipe 41. As the springs 25 are at this time under compression, they operate through the eccentrics and the pistons 21 to maintain a back pressure on the liquid in the passage 22. The piston 32 will therefore be moved back toward the right as soon as the pressure behind the piston 32 is relieved by opening the exhaust pipe. As the piston 32 moves to the right, the lever 59 is moved about its lower end as a fulcrum and brings the pilot valve again back to central position, thereby cutting off the opening to the exhaust pipe, again bringing the valve 32 to rest. When the valve 32 moves to the right as above described, the eccentrics are being moved back toward central position.

The above described mechanism forms a simple and practical means for adjusting the pump and controlling its output, thereby controlling the speed of the fluid motor. It will be seen that the adjustment can be made while the pump and motor are running and without interfering in any way with their operation, and also that a smooth and gradual change in the speed to any degree desired may be readily obtained. The bearing sleeve 27 is preferably made quite long so as to avoid excessive wear.

Fig. 11 illustrates a modification of mechanism shown in Fig. 8. In this instance the passage 22' has an additional enlargement forming a motor chamber 22''. The piston 32' operates in substantially the same manner as the piston 32 in Fig. 8. A second piston 32'' however, is connected rigidly with the piston 32', and acts as a motor piston; that is, a sufficient pressure behind the piston 32'' drives the same and the piston 32' forward. As the piston 32'' is larger than the piston 32' the pressure in front of the latter is correspondingly increased. A small vent 66 opening to the atmosphere serves to relieve the pressure in front of the piston 32''.

Figs. 19, 20 and 21 illustrate still another modification of the mechanism shown in Fig. 8. In this instance the portion 22$^b$ of the driving shaft 3' extending beyond the casing A is substantially enlarged to form a chamber 22$^a$ in which a motor piston 32$^a$ is adapted to reciprocate. The left-hand end of the enlarged portion 22$^b$ is provided with four cylindrical openings 22$^c$ extending from the motor chamber 22$^a$. Secured to the piston 32$^a$ are four smaller pistons 32$^c$ which work in the cylindrical openings 22$^c$. Extending from the cylinders 22$^c$ are small pipes 67 located in recesses 68 in the driving shaft 3'. These pipes lead respectively to the four cylinders in the eccentrics, and serve to transmit fluid pressure from the cylinders 22$^c$ for adjusting the eccentrics. The operation is substantially the same as that of the construction shown in Fig. 11, except that fluid pressure is transmitted to the eccentrics independently. The advantage of this arrangement is that it insures an equal adjustment of all the eccentrics and prevents any oscillation of the eccentrics longitudinally of the blocks 20 which might occur when they are all connected with the same fluid pressure.

Figures 22, 23, 24, 25:
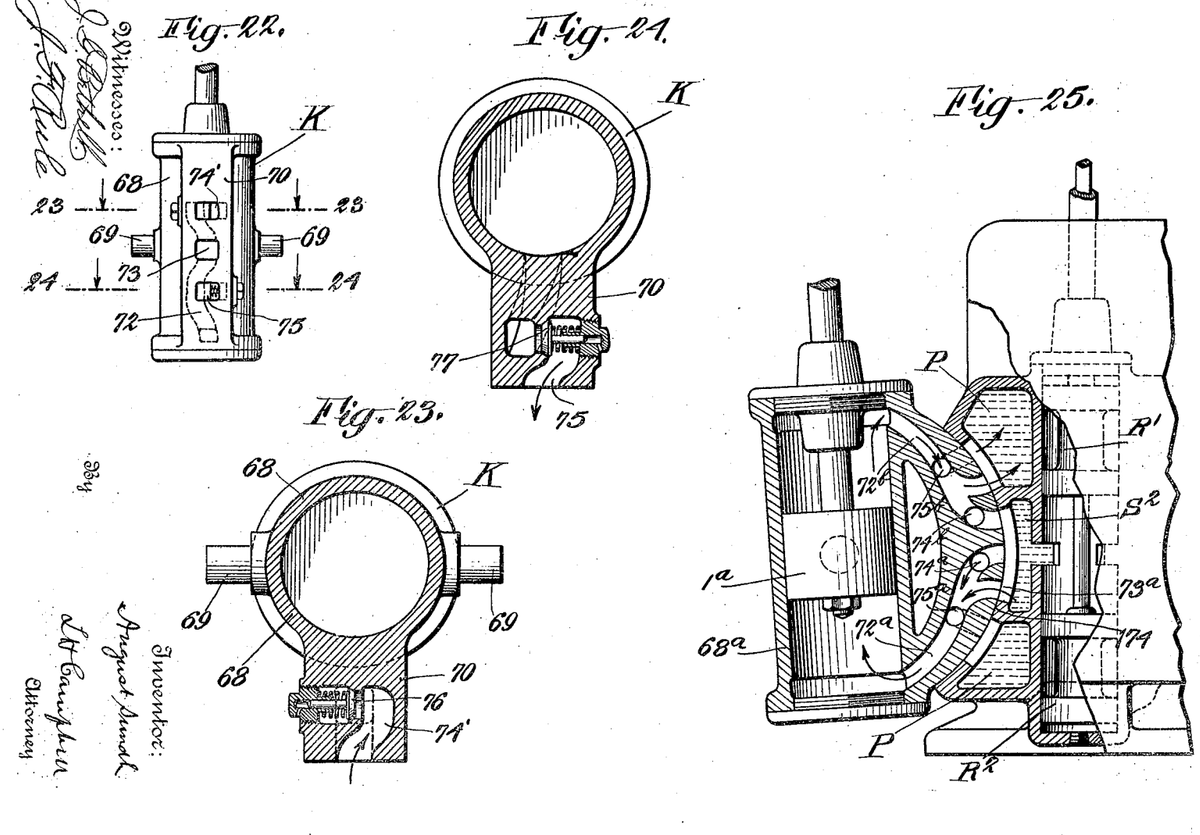
Fig. 22 is an elevation view of a pump cylinder and valve chamber.
Figs. 23 and 24 are enlarged sectional views taken on the lines 23—23 and 24—24 respectively of Fig. 22.
Fig. 25 shows a modification showing a double acting pump.

The construction of the pump cylinders K, K', etc., will be understood from a consideration of Figs. 2, 22, 23 and 24. As each section of the pump is substantially the same in construction, a description of one will suffice for all. Each section of the pump comprises a cylinder 68 provided with trunnions 69 journaled in stationary bearings, forming the pivot about which the cylinder oscillates. The cylinder 68 has an enlargement or extension 70 provided with passages for the flow of liquid to and from the cylinder, and check valves controlling the flow of liquid in said passages. The outer surface of the extension 70 is arc shaped and concentric with the trunnions 69. The arc shaped surface of the part 70 bears against or is adjusted into close proximity to a correspondingly shaped concave surface 71 of the pressure chamber P. A passage 72 extends from the lower end of the cylinder 68 to substantially the middle of the arc shaped surface of the part 70, forming at said surface a port 73. Additional passages 74' and 75 extend from the passage 72 to the outer surface of the part 70 above and below the port 73 respectively. As shown in Fig. 23, a spring pressed check valve 76 controls the passage 74' permitting a flow of fluid inwardly to the passage 72, but preventing an outward flow of the fluid through said passage. A similar check valve 77 (see Fig. 24) controls the passage 75, but opens outwardly, and thereby only permits an outward flow of the fluid through said passage.

The operation of the pump may be described as follows: Assuming the parts to be in the position shown in Fig. 2, the driving shaft 3 rotating in a clockwise direction as indicated by the arrow, the piston 1 will be moving upward. The passage 72 is at this time opened to a passage S$^2$ through the port 73. The passage S$^2$ communicates with or forms part of the supply chamber S. The liquid will therefore flow into the pump cylinder below the piston from the supply chamber through the passage 72. As the piston moves upward, the cylinder rotates about its axis 69, and the port 73 is gradually closed by the section 74 which separates the port 73 from a port 79 communicating with the pressure chamber P. When the piston reaches its uppermost position the port 73 is fully closed; the continued rotation of the driving shaft 3 carries the port 73 below the section 74, thereby opening the passage 72 through the port 79 to the pressure chamber P. The port 73 commences to open to the pressure chamber at substantially the same time that the piston commences to move downward; the downward movement of the piston forces the liquid outward through the passage 72 into the pressure chamber P. When the piston reaches the middle of its downward stroke the eccentric begins its movement toward the left and rocks the cylinder in the reverse direction, gradually closing the port 73. By the time the piston reaches its lowest position the port 73 is again opposite the section 74, and as the piston starts on its upward stroke, the port 73 is again opened to the supply chamber. It will thus be seen that the passage 72 may alone serve to convey the liquid to and from the pump cylinder during its normal operation. Passages 74' and 75 controlled by the check valves 76 and 77 respectively serve to permit a free flow of the fluid to and from the pump cylinder when the port 73 is partially closed or throttled by the section 74, and come into use principally when the pump is adjusted for only a short piston stroke. The passage 74′ is at all times opposite the port 78 so that while the piston is moving upward the liquid can flow into the cylinder through the passage 74′, and will do so when the port 73 is not opened sufficiently to permit a free flow of the liquid therethrough. The check valve 76 prevents the liquid escaping from the cylinder outward through the passage 74 at any time. The lower passage 75 with its check valve 77 has a similar function, only this passage permits a free outward flow of the liquid from the cylinder when the port 73 is partially throttled during the downward stroke of the piston. It will be observed that when the eccentric is adjusted to give only a short piston stroke, the passage 73 will always be partly closed, so that at this time the auxiliary passages 74 and 75 are principally in use.

Fig. 25 illustrates a modification in which a pump cylinder 68ᵃ with a double acting piston 1ᵃ is employed. In this construction two passages 72ᵃ and 72ᵇ leading to the lower and upper ends respectively of the cylinder, are provided. The port 73ᵃ corresponding to the port 73 of Fig. 2 moves back and forth across the section 174, connecting the passage 72ᵃ with the supply chamber during the upward stroke of the piston, and connecting it with the pressure chamber during the downward stroke. Passages 74ᵃ and 75ᵃ corresponding to the passages 74 and 75, serve the same function. The passages leading to the upper end of the cylinder, namely, 72ᵇ, 74ᵇ and 75ᵇ, correspond with the lower passages 72ᵃ 74ᵃ and 75ᵃ respectively, the only difference being that they communicate with the supply chamber during the downward movement of the piston, and with the pressure chamber during its upward movement, so that during the downward stroke of the piston, liquid is drawn from the supply chamber into the cylinder above the piston, and during the upward stroke this liquid is forced into the pressure chamber.

The construction and operation of the fluid motor, comprising the sections, M, M′, etc., is somewhat similar to that of the pump; the motor however, is driven by the fluid from the pressure chamber and serves to drive the shaft 7.

Referring to Fig. 2 which shows a section M′ of the fluid motor, it will be seen that the motor cylinder is provided with a segmental portion 70′ corresponding to the part 70 of the pump and opposite the concave bearing surface 71′. Four passages 81, 82, 83 and 84 lead from the surface 71′ inward to the reversing valve chamber. Passages 85 and 86 lead from the upper and lower ends respectively of the motor cylinder; the passage 85 is brought into communication alternately with the passages 81 and 82, while the passage 86 communicates alternately with the passages 83 and 84 during the operation of the motor. With the parts in the position shown in Fig. 2, the pressure chamber is in communication with the upper end of the motor cylinder, and the supply chamber is in communication with the lower end of the cylinder. The liquid from the pressure chamber is therefore flowing into the cylinder, forcing the piston downward, and thereby rotating the driven shaft 7 in the direction indicated by the arrow, the liquid below the piston being forced into the supply chamber. As the piston continues its downward movement from the position shown, the cylinder is rotated about its trunnions toward the vertical position; when the piston reaches its lowest position the passages 85 and 86 are cut off from the passages 81 and 83 respectively. As the piston moves upward, the continued rotation of the cylinder opens the passages 85 and 86 to the passages 82 and 84 respectively. The lower end of the cylinder is now in communication with the pressure chamber, and the upper end in communication with the supply chamber, so that the liquid under pressure forces the piston upward to drive the shaft 7. The four cranks connecting the motor piston rods with the driven shaft 7, are each set at an angle of 90 degrees in advance of the preceding driving crank so that never more than two of the motor sections are on the dead centers at the same time. The eccentrics for the pump are arranged in the same manner.

Figures 4, 6:
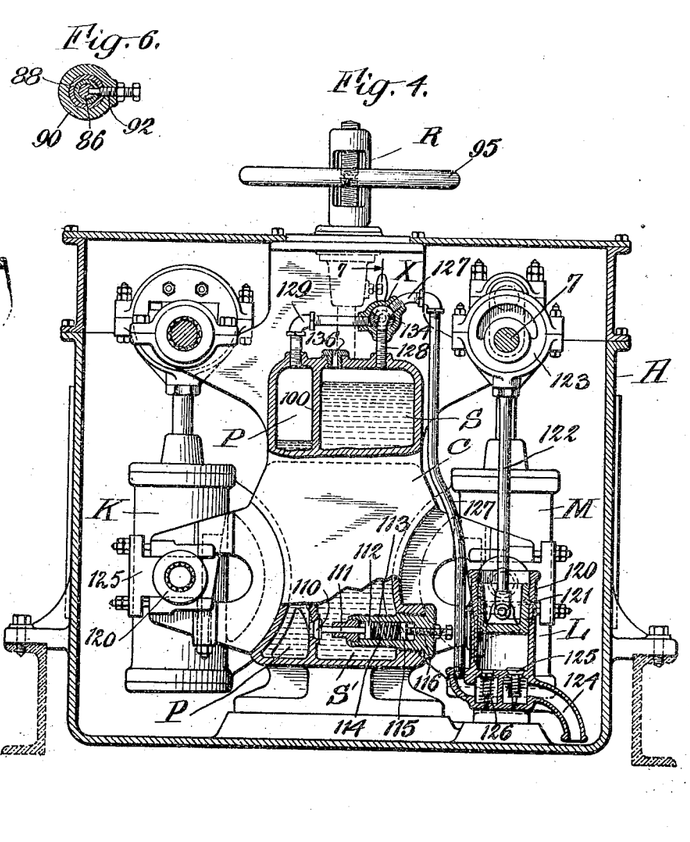
Figure 5:
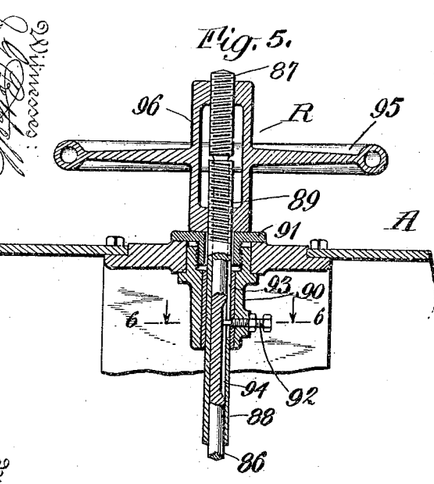
Fig. 5 is a sectional detail view of the mechanism for operating the reversing valves.

The reversing valves R′ and R² and the mechanism for operating the same as shown in Figs. 2, 5 and 6 will now be described. These valves as shown in Fig. 2 are arranged for vertical movement toward and from each other; the lower valve R² is connected to the lower end of a rod 86 which extends upwardly through the casing A, and has at its upper end an enlarged screw-threaded section 87. The upper valve R′ is secured to the lower end of a hollow rod or sleeve 88, which surrounds the rod 86, the parts 86 and 88 forming telescoping members. The upper end of the sleeve 88 is provided with screw-threads 89. The stationary sleeve 90 secured to the top of the casing A by a nut 91 forms a support or guide for the telescoping members 86 and 88; screw-threads on these members are left and right-hand respectively. A guide pin 92 threaded into the sleeve 90 extends through a slot 93 formed in the sleeve 88 and into a groove 94 in the rod 86, and prevents the rod and sleeve from rotating, but permits a vertical movement. A hand-wheel 95 is provided with a hub 96 screw-threaded to receive the telescoping members. When this hand-wheel is rotated in one direction, the rod 86 is moved upward and the sleeve 88 downward to bring the reversing valves toward each other, and when rotated in the reverse direction, the valves are separated. Fig. 2 shows the valves separated. It will be observed that these valves R' and R² are perfectly balanced so that little power is required to operate them.

As shown in Fig. 2, the valve R' permits a flow of liquid from the pressure chamber P through a port 97 and around the reduced portion of the valve to the passage 81. The valve R² likewise permits a flow of fluid from the pressure chamber through a port 98 and around the valve to the passage 84.

Figures 16, 17, 18:
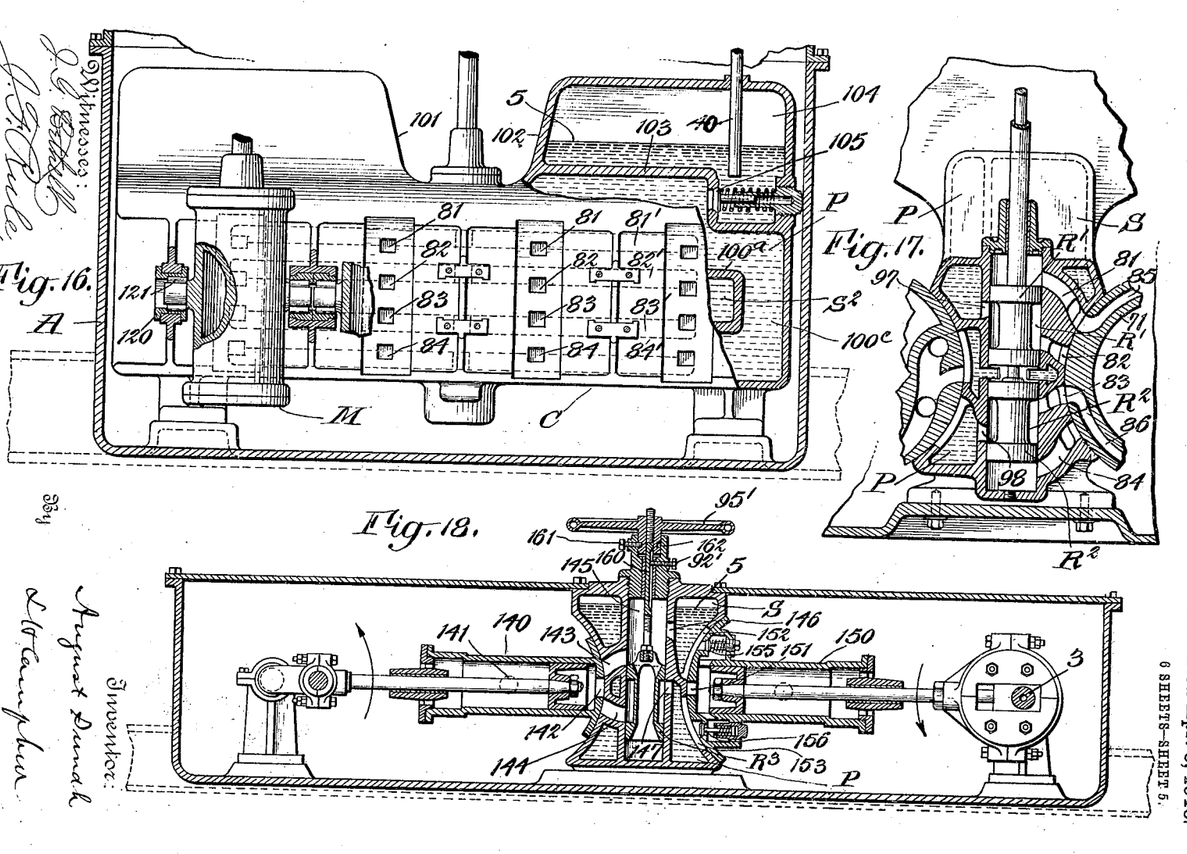
Fig. 16 is a part sectional elevation with parts broken away and certain parts removed to show various features of construction.
Fig. 17 is a fragmentary view corresponding with Fig. 2, but with the reversing valves in a different position.
Fig. 18 is a longitudinal sectional elevation showing a modified form and arrangement of the pumps and motors.

Fig. 17 shows the valves R' and R² brought together into position to cause the fluid motor to operate in the reverse direction. In this position the passage 97 communicates with the passage 82, but is cut off from the passage 81 by the upper end of the valve R'. The passage 81 is at this time in communication through the hollow valve R' with the passage S² leading to the supply chamber. The pressure chamber also communicates through the port 98 with the passage 83, and the passage 84 communicates through the hollow valve R² with the supply chamber. It will readily be understood that with this arrangement of valves the direction of operation of the fluid motor will be reversed; for example, the motor is in the same position in Fig. 17 as in Fig. 2, but as the passage 86 leading to the lower end of the motor cylinder is in communication with the pressure chamber, the upper passage 85 is in communication with the supply chamber, the motor piston will move upward. The reversing valves may be used if desired, to control the speed of the fluid motor as well as to determine its direction of movement. By moving the valves toward each other from the position shown in Fig. 2, the passages 81, 82, 83 and 84 will be gradually closed by the valves, thereby throttling the circulation of fluid through the pump, and reducing its speed, and when the valves are substantially half-way between the positions shown in Figs. 2 and 17, the passages will be completely closed, and therefore stop the motor. It will be readily seen that by moving the valves a greater or less distance in either direction from this intermediate position, the direction and speed of the motor may be controlled. The speed however, is usually controlled by adjusting the eccentrics for the pump by the mechanism shown in Fig. 8, the reversing valves being used only to control the direction of the motor.

The pressure and supply chambers are formed by a casing C which is located within and extends longitudinally of the outer tank or casing A. The pressure chamber P is separated from the supply chamber S by a vertical wall 100 as indicated in Figs. 2 and 3 and by dotted lines in Fig. 1. The central portion of the casing C as shown in Fig. 16 is lower than the end portions 101 and 102. A partition 103 separates a section of the pressure chamber in the end portion 102 from the rest of the pressure chamber, thereby forming a separate pressure chamber 104. The pipe 40 for supplying fluid pressure to the pilot valve V may lead from this chamber 104. A check valve 105 controls a port in the partition 103 and prevents a backward flow of fluid from the pressure chamber 104. The purpose of this check valve is to maintain the pressure supply in the chamber 104 when the pressure in the chamber P is reduced from any cause; as for example, by stopping the pump. The partition wall 100 has laterally extending portions 100ª and 100ᵇ forming a passage S² which constitutes a part of the supply chamber and divides the pressure chamber into upper and lower portions, which are connected however, by vertical passages 100ᶜ, (Fig. 16), at the ends of the case C. The portion of the pressure chamber in the upper left-hand end 101 of the casing C constitutes an air chamber, as indicated in Figs. 3 and 4. The air in this chamber, which is under compression, acts as a cushioning device to maintain an even pressure and secure smooth operation of the power transmitting mechanism. The passages 81, 82, 83 and 84 for conveying liquid to and from the motor cylinders are connected by longitudinal passages 81', 82', 83' and 84', as indicated in Figs. 3 and 16. These longitudinal passages serve to convey the liquid between the reversing valve chamber and the passages 85 and 86 for the several sections of the motors.

In order to prevent excessive pressure in the pressure chamber P, a relief valve 110 (see Fig. 4) is provided to control a port between the pressure and supply chambers. This valve is provided with a stem 111 having a head 112 movable in the hollow guide or sleeve 113, which is threaded into the casing C. A coil spring 114 behind the head or washer 112 serves to normally hold the valve against its seat. A washer 115 is placed behind the spring and an adjustable set screw 116 bears against this washer, and is adjustable to compress the spring 114 to a greater or less extent, and thereby vary the pressure on the valve. The set screw may be adjusted so that the valve 110 will open when the pressure in the chamber P reaches any desired limit. This relief valve 110 will therefore allow the fluid to pass from the pressure chamber P into the supply chamber S whenever the pressure becomes too great, which may happen if the load on the motor is excessive, or when the reversing valve is used to control the speed of the motor or to stop the motor, or for reversing the motor when a large volume of fluid is being delivered by the pump. The particular construction of this relief valve and the means for regulating the same may be widely varied.

Adjustable roller bearings are provided for the cylinders of the motor and the pump, as shown for example, in Figs. 3, 4 and 16. Each bearing comprises a sleeve 120 in which are placed bearing rollers 121. The bearing sleeve 120 is supported by and adjustable horizontally in a pair of horizontal arms 122 and 123, which as herein shown are cast integral with the casing C. A cotterpin 124, which is wedge shaped and adjustable vertically forms a stop against which the sleeve 120 bears. An outer cap or bearing member 125 held in position by bolts 126 and set nuts 127, holds the bearing sleeve 120 against the cotterpin. To adjust the bearing in order to take up any play there may be between the pump or motor cylinder and the casing C, the cotterpin 124 is loosened or removed, and the nuts 127 screwed up to move the bearing sleeve inward. When the bearing is adjusted to proper position, the cotterpin 124 is tightened by means of a nut 124', and thereby holds the bearing securely in position. The bearings for each of the cylinders are in this way independently adjustable to take up any wear, and thereby prevent excessive leakage between the cylinders and the stationary casing. Roller bearings are also provided for the driving shaft 3 and the driven shaft 7. Each of these bearings comprises a sleeve or bushing 120 and bearing rollers 121 between said sleeve and shaft. The bushings 120 are supported in bearing boxes 128 having caps 129 bolted thereto. These bearing boxes 128 may be secured to or cast integral with arms 130 extending laterally from the casing C.

Figure 7:
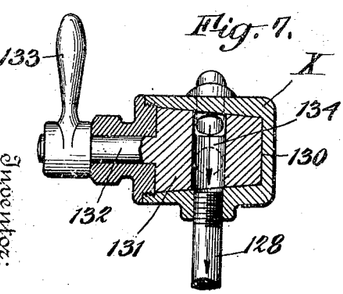
Fig. 7 is a detail view of the three-way valve shown in Fig. 4.

As the mechanism is contained in the oil proof casing A, the packings for the various parts which would otherwise be required may be dispensed with, thereby greatly reducing the friction of the moving parts and simplifying the construction. In order to again introduce into the circulating system any of the oil which may escape by leakage, a small auxiliary pump L is provided, as shown in Figs. 1 and 4. This pump comprises a cylinder 120, a piston 121, and a piston rod 122 connected to an eccentric 123 secured to the driven shaft 7. A small pipe 124 extends from a point near the bottom of the casing A to the lower end of the pump cylinder. A check valve 125 opening toward the cylinder controls the passage 124. A second check valve 126 in the bottom of the pump cylinder opens outwardly and controls the discharge passage leading from the pump. This passage comprises a pipe 127 extending upward and connected to a three-way valve X. From this valve a pipe 128 extends to the supply chamber, and a pipe 129 extends to the pressure chamber. The three-way valve X as shown in Fig. 7 comprises a valve chamber 130 and a rotary valve 131 provided with a stem 132 and a handle 133. This valve has a Y passage or opening 134, so that the pipe 127 may be connected either with the pipe 128 leading to the supply chamber or with the pipe 129 leading to the pressure chamber. This valve is normally in the position shown in Fig. 4 so as to connect the pump L with the supply chamber. When the shaft 7 is being rotated by the motor, the pump L is in operation, the upward movement of the pump piston draws into the cylinder any liquid that may be in the bottom of the casing A, and as the piston is moved downward on the return stroke, the liquid is forced through the pipe 127 and into the supply chamber S. As the leakage of oil will not ordinarily equal the capacity of the pump L, the latter will pump a good deal of air into the supply chamber S, but this air will immediately escape through an opening 136 in the top of the supply chamber. Whenever the supply of air in the pressure chamber becomes insufficient, the valve X may be turned to connect the pipe 127 with the pipe 129; the pump L will then operate to force a fresh supply of air into the pressure chamber. The height of the liquid in the pressure chamber may be indicated by an ordinary glass tube or indicator, if desired.

In Fig. 18 I have shown a modified construction and arrangement of the pump, motor and reversing valve mechanism. In this instance the pistons for the pump and motor are each single acting, or in other words, the fluid only operates on one side of the piston. The cylinders are also horizontally disposed. The motor cylinder 140 oscillates about the pivot 141. A port 142 in the inner end of the cylinder is brought into communication with the passages 143 and 144, as the inner end of the cylinder moves respectively above and below a central position. The passages 143 and 144 lead to the valve chamber 145. In this instance a single reversing valve $R^3$ is employed. With the valve in its lowered position, as shown, the passage 143 is in communication with the supply chamber S through a port 146 and the valve chamber above the valve. The passage 144 is in communication with the pressure chamber P through a port 147. The pump cylinder 150 is provided at its inner end with a port 151 adapted to be brought opposite the ports 152 and 153 in the supply and pressure chambers respectively. The operation of the pump and motor with this construction is substantially like that of the construction already described, and will readily be understood without a detailed explanation. The driving shaft operates the pump in the direction indicated by the arrow (Fig. 18), and while the piston is moving outward, the port 151 is opened to the supply chamber S, and while the piston is moving inward, the port 151 is opened to the pressure chamber P, and the liquid is forced from the pump cylinder into the pressure chamber. Check valves 155 and 156 serve the same purpose as the check valves shown in Figs. 23 and 24, that is, the valve 155 which opens toward the pump cylinder will always permit a free flow of fluid from the supply chamber to the cylinder during the outward stroke of the piston, and the valve 156 which opens toward the pressure chamber will always permit an unrestricted flow of fluid from the cylinder to the pressure chamber while the port 151 is partially closed. To reverse the operation of the motor, the valve $R^3$ is moved upward so as to place the port 146 in communication with the passage 144 through the hollow valve. This position of the valve also places the port 147 in communication with the passage 143. The valve $R^3$ has a valve stem 160 screw-threaded at its upper end to receive the hand-wheel 95′. A pin 92′ engages a slot in the stem 160 and prevents rotation of the latter. The hand-wheel 95′ is held against vertical movement by a pin 161 engaging an annular groove 162 in the hub of the wheel. With this construction, when the hand-wheel is rotated in one direction, the valve will be moved upward, and when rotated in the reverse direction the valve will be moved downward.

From the foregoing description in connection with the drawings it will be seen that a simple and highly efficient power transmission mechanism is obtained, and that the speed and torque of the driven shaft may be regulated at will and without interfering with the continued operation of the mechanism, and also without any steps or sudden changes in the speed. The stroke of the pump pistons is regulated in an ingenious manner, and the volume of fluid delivered to the motor thereby regulated and controlled. A high efficiency is obtained through the use of the anti-friction bearings, and on account of the use of rocking cylinders for the pump and motor which do away with the usual valves and also dispense with the cross-heads and connecting rods that are required when stationary cylinders are used. As the piston rods in the cylinders are directly connected with the shafts, a direct pull between the shaft and piston is always obtained, so that the usual packings which are not only bothersome, but lower the efficiency, are dispensed with. As a thin oil is used for the power transmitting medium, the parts are kept well lubricated, and with the mechanism inclosed, the machinery is kept free from dust and dirt and any loss of oil.

The system of transmitting power as herein disclosed is adapted for use in various places, as for example, on automobiles and trucks, on boats, elevator machinery, railway cars, etc. Where the invention is to be used on automobiles or boats where it is important to have the mechanism as light as possible, the same may be constructed of steel and aluminum. Where the question of weight is not of great importance, cast iron may be employed and a more substantial construction obtained.

Although in the drawings the cylinders for the pump and motor are shown as substantially the same size, it will be understood that the relative size of these cylinders may be greatly varied, as for example, if it is desired to connect the pump with a high speed prime mover, such as a gasolene engine or electric motor, it may be desirable to make the pump cylinders smaller in diameter and have a shorter piston stroke. By having the motor cylinders comparatively large the speed of the driven mechanism will be correspondingly reduced as compared with the speed of the driving mechanism.

I wish not to be limited to the particular type of hydraulic motor herein disclosed, as it is possible to connect up different kinds of motors to the pump, such as reciprocating motors with stationary cylinders of the well known Brotherhood type, and also many forms of rotary motors might be employed.

I wish not to be limited to the particular forms of construction herein disclosed, as various changes in the details of construction and arrangement of parts might obviously be made without departing from the spirit and scope of the invention.

What I claim as new and desire to obtain by Letters Patent of the United States is:—

1. In power transmitting mechanism, the combination with a hollow driving shaft, of an eccentric adjustably mounted thereon, a liquid within said shaft and communicating with the eccentric, a piston within the hollow driving shaft and operable to transmit pressure through said liquid to the eccentric and thereby adjust the position of the latter on the driving shaft, means for operating said piston, a pump cylinder, a piston therein, and a piston rod connecting the piston and eccentric.

2. In power transmitting mechanism, the combination with a hollow driving shaft, of a plurality of eccentrics mounted on the driving shaft, liquid within the driving shaft and in communication with the eccentrics, a piston movable longitudinally within the shaft and operable to transmit pressure through said liquid to the eccentrics and thereby adjust the latter simultaneously, means for operating said piston, a pump comprising a plurality of cylinders, pistons adapted to reciprocate in the pump cylinders, and piston rods connecting the eccentrics with the pump pistons.

3. In power transmitting mechanism, the combination with a rotary driving member, of a plurality of adjustable eccentrics carried thereby, oscillating pump cylinders, pistons in said cylinders, piston rods connecting the pistons with the eccentrics, means for adjusting the eccentrics and thereby adjusting the length of stroke for the pistons and the extent of oscillation of the cylinders, said cylinders being provided with ports for the passage of fluid to and from the cylinders, the opening and closing of said ports being controlled by the oscillation of the cylinders, a fluid operated motor, and means for conveying fluid between the pump and motor.

4. In power transmitting mechanism, the combination with a pump, of a motor adapted to be driven by fluid pressure supplied from the pump, said pump and motor each comprising a plurality of pivoted oscillating cylinders, means to vary the rate at which fluid is delivered to the motor, and pistons adapted to reciprocate in said cylinders, a crank shaft provided with cranks at different angles, and piston rods connecting the motor pistons and said cranks.

5. In power transmitting mechanism the combination with a driving member and a driven member, of a pump comprising a plurality of oscillating cylinders, driving connection between said driving member and pump, a motor comprising a plurality of pivoted oscillating cylinders, connections between the motor and said driven member, means for transmitting a liquid from the pump to the motor to operate the latter, and mechanism to vary the rate at which the liquid is delivered by the pump, and thereby vary the speed and torque of the motor.

6. The combination with a pump, of means for operating the pump, a supply chamber in communication with the pump, a pressure chamber to receive liquid delivered by the pump, a motor, means for conveying liquid from the pressure chamber to the motor, means for returning the liquid from the motor to the supply chamber, a casing inclosing said parts, an auxiliary pump for automatically returning into the circulating system any liquid that may leak therefrom into said casing, and means to connect said auxiliary pump with the pressure chamber.

7. The combination with a pump, of means for driving the pump, a liquid circulated by the pump, mechanism driven by said liquid, an auxiliary pump for automatically returning into circulation any liquid escaping therefrom, and means for connecting the auxiliary pump with either the pressure or suction side of the first-named pump.

8. The combination with a pump, of means for operating the pump, a motor, a supply chamber communicating with the pump, means for transmitting fluid from the pump to the motor to operate the latter, means for returning the liquid from the motor to the supply chamber thereby completing the circulation, an auxiliary pump operable to automatically return to the supply chamber any liquid leaking from the circulating system and means to connect said auxiliary pump directly with the pressure side of the motor.

9. The combination with a driving member and a driven member, of a pump connected to the driving member, a supply chamber communicating with the intake of the pump, a pressure chamber adapted to receive liquid under pressure delivered by the pump, a motor operable by liquid from the pressure chamber, connections between the motor and driven member, an air chamber connected with the pressure chamber, and an auxiliary pump driven by the motor and operable to pump a fluid into either the pressure chamber or the supply chamber.

10. The combination with a circulating system comprising a pump, a motor, a supply chamber and a pressure chamber, of an auxiliary pump operated by the motor, and a device operable to convey air under pressure from the auxiliary pump to the pressure chamber and an operating liquid to the supply chamber.

11. The combination with a pump and motor, of a casing comprising a pressure chamber and a supply chamber, an outer casing inclosing said parts, an auxiliary pump, and means for conveying liquid therefrom to either the pressure or supply chamber.

12. The combination with a pump and a motor, of a pressure chamber and a supply chamber, an auxiliary pump, means for conveying fluid from the auxiliary pump to said chambers, and valve mechanism operable to cut off communication between either of said chambers and the auxiliary pump and establish communication between the other chamber and the auxiliary pump.

13. The combination with a pump and motor, of a pressure chamber and a supply chamber, an auxiliary pump, means for conveying fluid from the auxiliary pump to said chambers, and a three-way valve operable to connect either of said chambers with the pump.

14. The combination with a drive shaft and a driven shaft, of a pump and a motor operatively connected to the drive shaft and driven shaft respectively, and each comprising a plurality of oscillating cylinders, means for transmitting fluid between the pump and motor, and roller bearings for the said shafts and cylinders.

In testimony whereof, I have signed my name to this specification in the presence of two subscribing witnesses.

AUGUST SUNDH.

Witnesses:
 JOHN F. RULE,
 JAMES G. BETHELL.